H. BATES.
EDUCATIONAL TYPEWRITER KEYBOARD DEVICE.
APPLICATION FILED JAN. 24, 1919.
1,385,356.
Patented July 26, 1921.
2 SHEETS—SHEET 1.
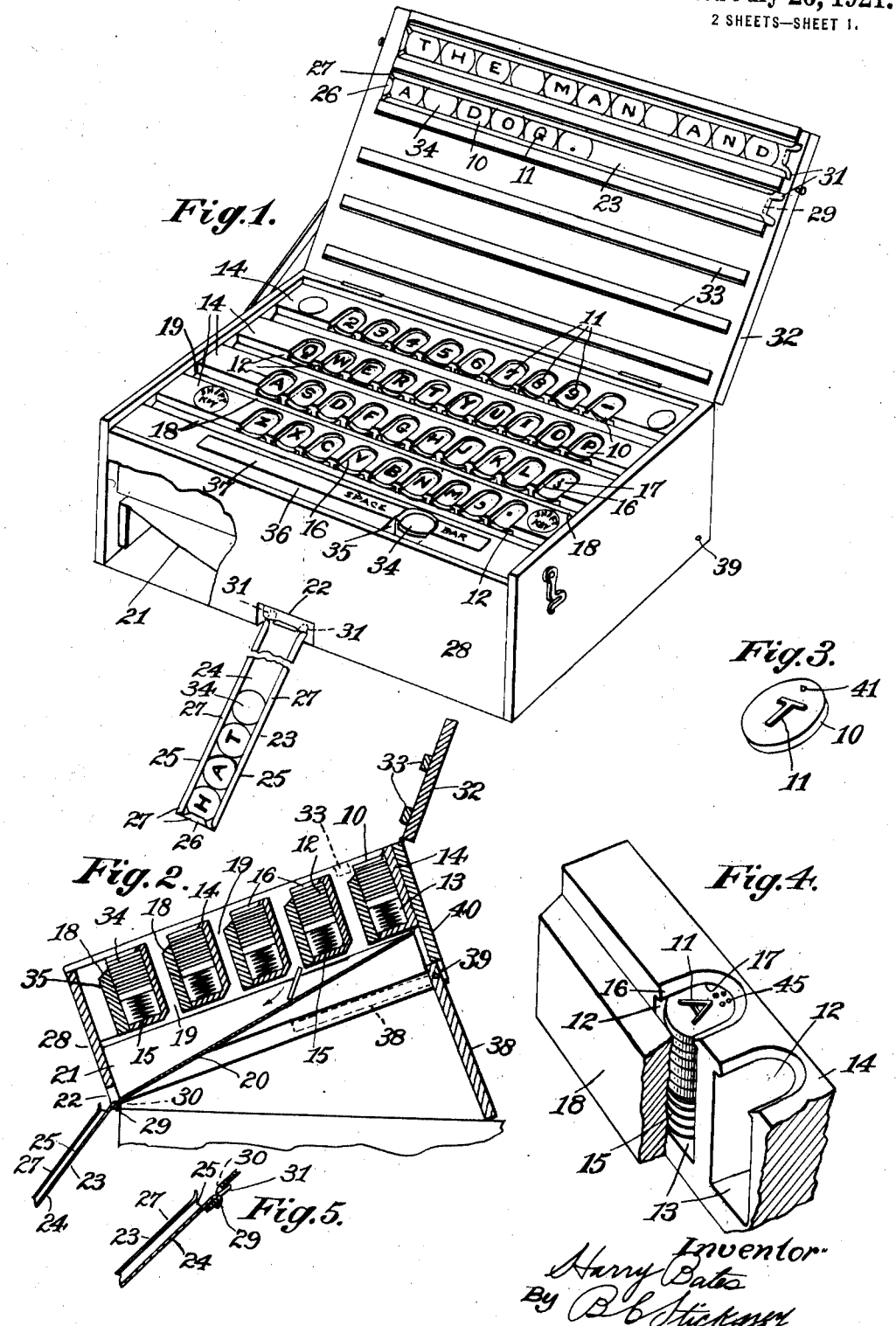

H. BATES.
EDUCATIONAL TYPEWRITER KEYBOARD DEVICE.
APPLICATION FILED JAN. 24, 1919.
1,385,356.
Patented July 26, 1921.
2 SHEETS—SHEET 2.
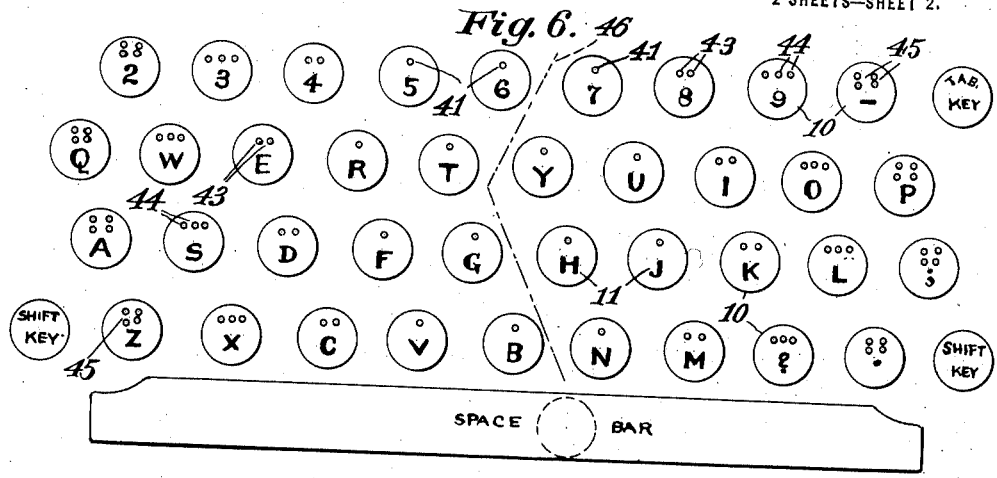
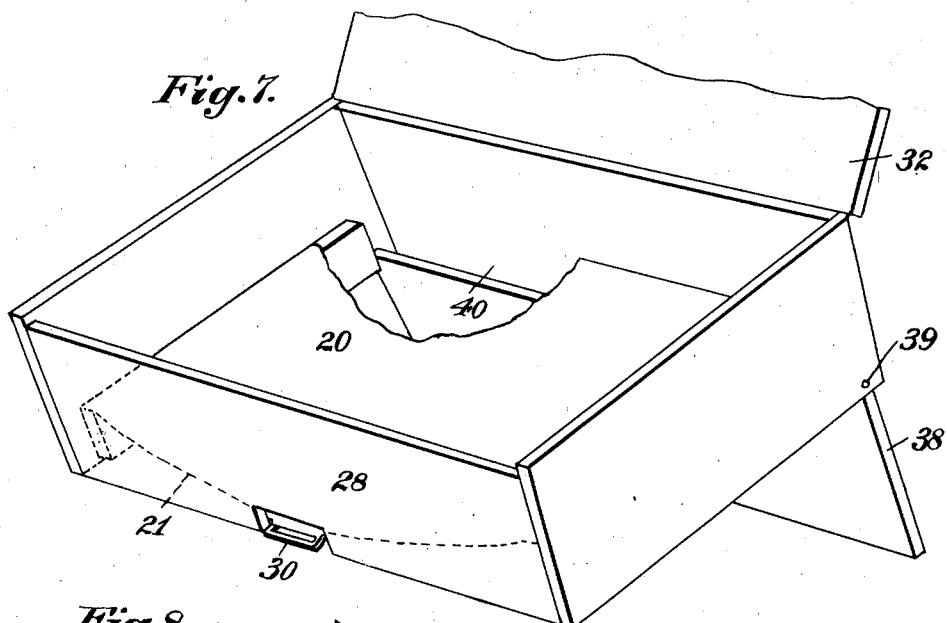
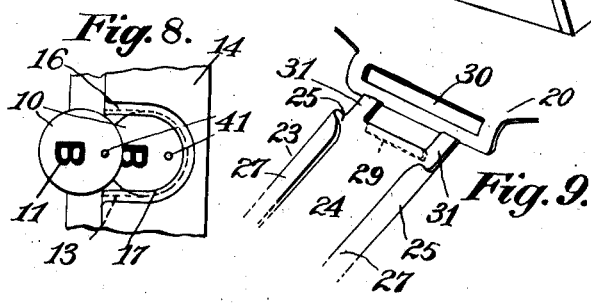
Inventor:
Harry Bates
By B. C. Stickney
Attorney

UNITED STATES PATENT OFFICE.

HARRY BATES, OF NEW YORK, N. Y.

EDUCATIONAL TYPEWRITER-KEYBOARD DEVICE.

1,385,356.  Specification of Letters Patent.  Patented July 26, 1921.

Application filed January 24, 1919. Serial No. 272,947.

*To all whom it may concern:*

Be it known that I, HARRY BATES, a citizen of the United States, residing in New York city, in the county of New York, and State of New York, have invented certain new and useful Improvements in Educational Typewriter-Keyboard Devices, of which the following is a specification.

This invention relates to educational toys, and is designed to provide a simple, inexpensive and efficient means for interesting a child in learning the location of keys on typewriter keyboards, as well as to give the child mental exercise in spelling words, punctuating, etc.

In carrying out the invention, there is provided a font or plenum of letter and figure bearing tablets, which are confined in a set of magazines. The characters on the tablets are normally formed and readable. There is one magazine for each letter of the alphabet, each numeral key, space key, punctuation key, etc., and in these magazines are stacked the tablets; the magazines being so constructed that the top tablet, which is always visible, may be readily withdrawn. The tablets appear like typewriter keys, and the magazines are arranged in spaced rows or banks to simulate the banks of keys in a typewriter keyboard, and the lettered key-simulating tablets are placed in the magazines in a manner to correspond with the arrangement and number of the letters on the typewriter keyboard, so that the entire device resembles such keyboard with its rows or banks of keys, and the child who uses the toy is unconsciously drilled in learning the location of the keys, etc., used in a typewriting machine, as well as in spelling.

To interest a child in the use of the toy, it is arranged that upon slipping out any tablets one by one from the magazines, they may be assembled to form words. For this purpose the tablets may be dropped into an underlying chute, whereby each will be conducted in its turn to a composing tray or chute, which may be of such width that the tablet will fit loosely therein, the letter upon the tablet being left exposed to view. Thus as the tablets to spell a word are picked out from the magazines and dropped one after another, they will automatically assemble themselves in the composing tray, which is of a length to permit the composition of several words, and may correspond to a composing stick used by type compositors. Several of these composing trays or sticks may be employed, and when a stick is filled, it may be set up on a rack, and may be followed by other sticks, so that an entire sentence may be read from the words so composed.

In redistributing the tablets, they are inserted one at a time in the magazines, in the same manner that a coin is inserted in an ordinary coin magazine or bank. The child thus is given additional exercise in locating the magazines, and hence the keys upon the typewriter keyboard.

Other features and advantages will hereinafter appear.

In the accompanying drawings,

Figure 1 is a perspective view of a toy, showing the present improvements in one form.

Fig. 2 is a sectional side elevation to illustrate the manner of assembling or composing the tablets.

Fig. 3 is a perspective view of a tablet.

Fig. 4 is a perspective view of a portion of one of the cross bars which contain the magazines.

Fig. 5 is a sectional fragmentary view, showing the manner of connecting the composing tray to the box.

Fig. 6 is a diagram of the arrangement of tablets, showing how the tablets may be provided with designations to guide the child in using the proper finger in operating each tablet.

Fig. 7 is a perspective view of the box with the magazines removed.

Fig. 8 is a diagram to illustrate the manner of inserting a tablet in a magazine.

Fig. 9 is a perspective view to illustrate the manner of connecting the composing tray to the main chute or directrix.

The tablets 10, each bearing a letter, figure or character 11, are assembled in magazines 12 arranged in four tiers or rows, in such a manner that the letters and characters 11 appearing at the tops of the magazines have an arrangement which corresponds substantially, as to order, size and separation, with the rows of keys in a typewriter keyboard (see Fig. 6). On the upper row or bank (Fig. 1) are disposed the figures or numerals; on the second row are the letters Q, W, E, R, T, Y, U, I, O, P; on the third row the letters A, S, D, F, G, H, J, K, L, and the semicolon; and on the fourth row the letters Z, X, C, V, B, N, M, and the comma and period, thereby completing the resemblance of the toy to a typewriter keyboard. The magazines are in the form of recesses 13 cut in four horizontal fixed bars 14. The key-simulating tablets may fit loosely in the magazines, and may be lifted or fed up by compression springs 15 placed in the bottoms of the magazines and pressing the top tablet up against an interior rim 16 which overhangs the top of the magazine, leaving a large sight-opening 17 through which the letter on the top tablet is conspicuous.

To withdraw a letter from any magazine, it is only necessary to place the finger upon the top tablet, and draw it forwardly over the top of a retaining bar 18, which retains the remaining tablets in the magazine. When one tablet is withdrawn, the remaining tablets are lifted by the underlying spring 15. The retaining bar 18 is arranged sufficiently below the rims or flanges 16 to permit the tablets to be slidden forwardly from the magazines.

The withdrawn tablets may be guided forwardly over the retaining bars 18, and may drop down through the spaces 19 which separate the magazine bars, and fall into a floor, chute or directrix 20, the sides of which, at its lower portion, incline downwardly to the middle, as at 21; and since the directrix is also inclined from rear to front, it forms a guide over which all tablets will slide to a common egress 22 placed at the middle of the lower edge of the directrix.

The tablet is thus delivered into a long, narrow tray 23, which may have the form of an inclined chute, and may consist of a floor 24 and sides 25, by which the tablet is loosely confined, so that the tablet may slide from top to bottom of the chute, and come to rest against the lower end 26 thereof. The sides and end may be provided with overhanging ledges or lips 27, to prevent escape of the tablets, while permitting the letters thereon to remain visible.

The tablets are selected and dropped one by one, thus filling the chute or tray 24, which serves the purpose of a composing stick, and is detachable from the box 28 in which the magazine bars 14 are mounted; the upper end of the stick having a hook 29 which catches upon an eye 30 projecting at the front of the box 28 below the egress 22; said composing stick having a supporting or locking tongue or tongues 31 which catch under the chute 20, as shown at Fig. 5.

When the tray or stick 24 is full, the lower end may be lifted and the stick may be thrust up endwise to disengage the hook 29 and release it from the box, the hook being then withdrawn through the eye 30. The tray 24 may then be slipped into place in a rack which may be provided upon a lid 32 hinged upon the box, the rack consisting of horizontal cleats 33 placed at such intervals one below another upon the inner face of the lid, that the trays will fit between them.

The spaces between the words which are thus composed may be supplied by the use of blank tablets 34, which may be placed in a special magazine 35 formed in a bar 36 below the other bars, and having a space-bar or key 37 formed thereon, corresponding to the usual space-bar at the front of a typewriter keyboard.

Mastery of the use of punctuation points is aided by the provision of magazines containing period, comma and other punctuation tablets, as seen at Fig. 1.

At the bottom of the box may be hinged a drop-leaf 38. This serves as a stand for elevating the rear of the box above the front thereof, so as to give the chute 20 the proper slant from rear to front, for guiding the tablets to the composing tray 24. This leaf may be hinged at 39 to the bottom of the rear wall 40 of the box, so as to fold up to a horizontal position within the box, as seen at Fig. 2 in dotted lines, where it is out of the way, and conduces to compactness.

In restoring the tablets, the child may remove them one by one from the trays 23, and insert each one in its appropriate magazine, by pressing down the tablet upon the top tablet already in the magazine (Fig. 8), until the new tablet can be slipped back edgewise under the detaining flange 16.

If desired, the child may be further instructed in the selection of the proper finger to use for each tablet, and for this purpose the tablets may be provided with various suitable designations, such as small depressions 41; certain tablets having a single depression to indicate that they are to be withdrawn by the first finger of the hand; other tablets having two such depressions, as at 43, to indicate that they are to be manipulated by the second finger; other tablets having three depressions, as at 44, to indicate the third finger; and the remaining tablets having four depressions, as at 45, to indicate the use of the fourth finger. A dividing line 46 may also be arranged to separate the left-hand from the right-hand portion of the keyboard.

Variations may be resorted to within the scope of the invention, and portions of the improvements may be used without others.

Having thus described my invention, I claim:

1. A device of the character described, comprising a font of key-simulating spelling tablets bearing normally readable letters and characters thereon, and a set of magazines in each of which tablets having like letters or characters thereon are normally stored, said magazines being so related, each with respect to the others, as to position the topmost exposed tablets therein in a relative arrangement corresponding with the relative arrangement of the keys of a typewriter.

2. A device of the character described, comprising a font of key-simulating spelling tablets bearing normally readable letters and characters thereon, a set of magazines in each of which tablets having like letters or characters thereon are normally stored, said tablets being removable from the top of the magazines one after another at will, and means for feeding the remaining tablets upward in said magazines as the topmost tablets are removed, said magazines being so related, each with respect to the others, as to position the topmost exposed tablets therein in a relative arrangement corresponding with the relative arrangement of the keys of a typewriter.

3. A device of the character described, comprising a font of key-simulating spelling tablets bearing normally readable letters and characters thereon, a set of magazines in each of which tablets having like letters or characters thereon are normally stored, said tablets being removable from the top of the magazines one after another at will, and an underlying chute to receive and guide removed tablets to a common egress, said magazines being arranged in spaced relation to provide intervening passageways through which the removed tablets may pass to said chute, and said magazines being so related, each with respect to the others, as to position the topmost exposed tablets therein in a relative arrangement corresponding with the relative arrangement of the keys of a typewriter.

4. A device of the character described, comprising a font of key-simulating spelling tablets bearing normally readable letters and characters thereon, a set of magazines in each of which tablets having like letters or characters thereon are normally stored, said tablets being removable from the top of the magazines one after another at will, an underlying chute to receive and guide removed tablets to a common egress, and a composing tray to receive the tablets as they pass through said egress, said magazines being arranged in spaced relation to provide intervening passageways through which the removed tablets may pass to said chute, and said magazines being so related, each with respect to the others, as to position the topmost exposed tablets therein in a relative arrangement corresponding with the relative arrangement of the keys of a typewriter.

5. A device of the character described, comprising a font of alphabetical and character spelling tablets, a set of magazines in which said tablets are stored, said magazines arranged in rows to correspond with the rows of keys on a typewriter keyboard, and provision being made for permitting the withdrawal of the top tablet from each magazine, spaces being provided between the rows of magazines, an underlying chute to receive tablets dropped through said spaces, constructed to guide the tablets to a common egress, and a composing tray arranged at said egress to receive the tablets, said tray constructed to receive the tablets at one end, and to detain the tablets while exposing to view letters thereon.

6. A device of the character described, comprising a font of alphabetical and character spelling tablets, a set of magazines in which said tablets are stored, said magazines arranged in rows to correspond with the rows of keys on a typewriter keyboard, and provision being made for permitting the withdrawal of the top tablet from each magazine, spaces being provided between the rows of magazines, an underdlying chute to receive tablets dropped through said spaces, constructed to guide the tablets to a common egress, a composing tray arranged at said egress to receive the tablets, said tray constructed to receive the tablets at one end, and to detain the tablets while exposing to view the letters thereon, and a rack to receive a series of trays.

7. A system of banks of magazines, and a font of readable letter and character key-simulating spelling tablets contained in said magazines, the arrangement of the magazines simulating the usual arrangement and number of keys in a typewriter keyboard, said magazines being in the form of recesses formed in transverse bars, placed one in front of and below another like the rows of typewriter keys.

8. A system of banks of magazines, a font of readable letter and character key-simulating spelling tablets contained in said magazines and removable therefrom from the top, the arrangement of the magazines simulating the usual arrangement and number of keys in a typewriter keyboard, said magazines being in the form of recesses formed in transverse bars, placed one in front of and below another like the rows of typewriter keys, and means for feeding the remaining tablets upward in said magazines at each removal of a tablet from the top.

9. A device of the character described, comprising a font of key-simulating spelling tablets bearing normally readable letters and characters thereon, a set of magazines in each of which tablets having like letters or characters thereon are normally stored, said tablets being removable from the top of the magazines one after another at will, means for feeding the remaining tablets upward in said magazines as the topmost tablets are removed, said magazines being so related, each with respect to the others, as to position the topmost exposed tablets therein in a relative arrangement corresponding with the relative arrangement of the keys of a typewriter, the magazines of each row comprising a series of open front and open top recesses in a common body bar, a common detaining bar to close all except the upper portion of the open front of each of said recesses through which said tablets may be withdrawn, and confining rims overhanging said magazines so as to limit the upward movement of said tablets by said feeding means, but leaving a sight-opening therefor.

10. A system of magazines, a font of letter and character tablets contained in said magazines, the arrangement of the magazines simulating the usual arrangement of keys in a typewriter keyboard, detaining bars in front of said magazines, confining rims overhanging said magazines and leaving sight-openings for the tablets, said detaining bars placed below said confining rims or flanges, to permit the withdrawal of tablets, spaces being left in front of said detaining bars through which the withdrawn tablets may drop, and means below the magazines for guiding the tablets to a common egress, said guiding means in the form of a directrix or chute which is inclined forwardly and downwardly, and having at its lower portions sides which incline toward the middle, whereby the tablets are directed to said egress.

11. A device of the character described, comprising a font of readable, normally formed letter and character key-simulating spelling tablets, a set of magazines containing the tablets, and a composing tray in which the tablets may be composed.

12. A device of the character described, comprising a font of readable, normally formed letter and character key-like spelling tablets, a set of magazines containing the tablets, a composing tray in which the tablets may be composed, means for supporting said tray, and means common to the tablets for guiding them to said tray.

13. A device of the character described, comprising a font of readable, normally formed letter and character key-like spelling tablets, a set of magazines containing the tablets, a composing tray in which the tablets may be composed, means for supporting said tray, and means common to the tablets for guiding them to said tray, said tray having edge flanges to confine the tablets while leaving the characters thereon exposed to view.

14. A device of the character described, comprising a font of readable, normally formed letter and character key-simulating spelling tablets, a set of magazines containing the tablets, a composing tray in which the tablets may be composed, a box in which said magazines are arranged, and means for detachably connecting said tray to one end of said box.

15. A device of the character described, comprising a font of letter and character tablets, a set of magazines containing the tablets, a composing tray in which the tablets may be composed, a box in which said magazines are arranged, and means for detachably connecting said tray to one end of said box, said box having an egress and an eye at said egress, and said tray having a hook to catch upon said eye.

16. A device of the character described, comprising a font of letter and character tablets, a set of magazines containing the tablets, a composing tray in which the tablets may be composed, a box in which said magazines are arranged, and means for detachably connecting said tray to one end of said box, said box having an egress and an eye at said egress, and said tray having a hook to catch upon said eye, and also having a locking tongue to prevent accidental disengagement of the tray from the box.

17. A device of the character described, comprising a font of letter and character tablets, a set of magazines containing the tablets, a composing tray in which the tablets may be composed, a box in which said magazines are arranged, means for detachably connecting said tray to one end of said box, a lid being provided upon said box, and a composing tray rack arranged upon said lid.

18. A device of the character described, comprising a font of alphabetical and character key-simulating spelling tablets, of a set of magazines in which said tablets are stored, said magazines arranged in banks and simulating the banks of keys on a typewriter keyboard, said tablets provided with various finger designations.

HARRY BATES.

Witnesses:
CATHERINE A. NEWELL,
JENNIE P. THORNE.